United States Patent
Amano

(10) Patent No.: US 9,915,731 B2
(45) Date of Patent: Mar. 13, 2018

(54) RADIO SENSING DEVICE AND RADAR SYSTEM

(71) Applicant: U-SHIN LTD., Tokyo (JP)

(72) Inventor: Yoshihisa Amano, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 384 days.

(21) Appl. No.: 14/805,855

(22) Filed: Jul. 22, 2015

(65) Prior Publication Data

US 2016/0025853 A1 Jan. 28, 2016

(30) Foreign Application Priority Data

Jul. 24, 2014 (JP) .................................. 2014-150964
May 22, 2015 (JP) .................................. 2015-104535

(51) Int. Cl.
*G01S 13/93* (2006.01)
*G01S 7/02* (2006.01)

(52) U.S. Cl.
CPC ............ *G01S 13/931* (2013.01); *G01S 7/023* (2013.01); *G01S 2013/9375* (2013.01); *G01S 2013/9378* (2013.01)

(58) Field of Classification Search
CPC ....................................................... G01S 7/023
USPC .......................................................... 342/70
See application file for complete search history.

(56) References Cited

U.S. PATENT DOCUMENTS 4,935,742 A * 6/1990 Marin ....................... G01S 7/02
342/13

FOREIGN PATENT DOCUMENTS

JP 10-105228 4/1998

OTHER PUBLICATIONS

Aoyagi, Yasushi, "Development of Automotive Active Safety System Using 24GHz-band High Resolution Multi-Mode Radar", Furukawa Electric current news; No. 132, Sep. 2013, pp. 20-25.
Schneider, Martin, "Automotive Radar—Status and Trends", GeMuc 2005, pp. 144-147.

* cited by examiner

*Primary Examiner* — Tashiana R Adams
*Assistant Examiner* — Helena H Seraydaryan
(74) *Attorney, Agent, or Firm* — BrainwoodHuang

(57) ABSTRACT

A radio sensing device includes N antennas, N being a natural number which is one or more, a switching control unit that sequentially switches the antennas and scans radio waves in some directions or all directions in a circular shape or a spherical-shell shape, and a random number generating unit that generates random numbers. The switching control unit performs an operation of switching selecting orders of the N antennas on the basis of the generated random numbers within a time which is M (M; positive integer) times a unit time required to sequentially scan each of all the N antennas once.

9 Claims, 15 Drawing Sheets

RADIO SENSING DEVICE AND RADAR SYSTEM

BACKGROUND

Field of the Invention

The present invention relates to a radio sensing device and a radar system and, more particularly, to a radio sensing device and a radar system which perform wide-angle monitoring by using a plurality of short-range radar sensors which have been rapidly popularized in recent years to avoid the risks of vehicle-to-vehicle collision, vehicle-to-person collision, vehicle-to-railcar collision, and the like.

It is an object of the present invention to minimize the probability of radio interference in radio sensing devices which scan beam directions in a circular shape or a spherical-shell shape. For this reason, the invention cannot only be applied to a CTA (Cross Traffic Alert) radio sensing device but also be widely applied to a radio sensing device having the same scanning function as described above or a similar radio sensing device.

Description of Related Art

In recent years, an obstacle radar has been rapidly popularized. In addition to a well-known 60/77-GHz-band long-range radar (LRR: Long Range Radar) that linearly detects an area far from a vehicle front, a new 24/26-GHz short-range radar (SRR: Short Range Radar) that detects a rear area or a side area of a vehicle in a sector shape begins to be popularized.

A radio sensing device for CTA (Cross Traffic Alert) uses the SRR and is called one of typical techniques for vehicle. In 2013, the CTA has been already employed by five automobile manufacturers in Western markets, and the same function as that of the CTA has also been employed by domestic automobile manufacturers. About the CTA, see "Development of Automotive Active Safety System Using 24 GHz-band High Resolution Multi-Mode Radar", Furukawa Review No. 132 (September, 2013).

An outline of the CTA will be described below with reference to FIG. 11. It is assumed that a plurality of vehicles (401 to 406) are parked without a parking space in a parking area and one of the vehicles is your own vehicle (403). In this state, when you try to drive your vehicle out of the parking area, your views in the horizontal directions are blocked by the vehicles (402 and 404) next to your vehicle to make blind spots. Since the blind spots are just on an aisle in the parking area, another vehicle (407) may dangerously come across the aisle in front of your vehicle. In particular, in a parking area in Europe or the United States, in contrast to in a parking in Japan, since a forward-parking and reverse-starting manner is popularly used, a drive of a vehicle in a reverse-starting state may easily pass over the vehicle (407) coming across the aisle in back of the vehicle.

Thus, in the conceived CTA, sector-shaped detection areas (411 and 412) are formed by radars installed at corner portions (in this case, rear corner portions) of a vehicle to try to detect the approaching vehicle (407) coming across the aisle.

One of the sector-shaped detection areas for CTA is popularly achieved by combining about four radio beams. An example of the structure of the combination is shown in FIG. 10. In this example, a radio sensing device including four antennas is built in each of the front and rear corner portions of your own vehicle (vehicle 1). Outputs of the four antennas are connected to a 4-to-1 switch circuit (321), and a switch control circuit (323) sequentially selects each of the four antennas as shown in a time chart in FIG. 10. In this case, it is assumed that a time required to sequentially select each of all the four antennas is defined as T. Since the four antennas are installed to have different directions in the form of a sector, radio beams are formed in different directions every moment to consequently cover sector-shaped detection areas (411 and 412) within the time T. That is, a sector-shaped detection area (411) is formed by the four beams, and a sector-shaped detection area (412) is also formed by four other beams.

A block diagram of a radio sensing device using a scheme which is similar to the above switch changeover scheme can be seen in, for example, FIG. 3, FIG. 4, and the like in M. Schneider, "Automotive Radar-Status and Trends", pp. 144 to 147, GeMic 2005. Note that the 24-GHz-band SRR is used in not only the CTA but also a radio sensing device for other purposes such as an RVM (Rear Vehicle Monitoring) which is employed by domestic vehicle manufacturers. The 24-GHz-band SRRs of several types have been simultaneously mounted on one vehicle recently.

In contrast to this, in Japan, allocation of frequencies of 24-GHz-band radars is limited to a 200-MHz range from 24.05 GHz to 24.25 GHz as described in ARIB STD-T73. In this case, a bandwidth and a spatial resolution in radar sensing are in inverse proportion to each other, the 200-MHz bandwidth is hard to be divisionally used without sacrificing the spatial resolution. For this reason, under present circumstances, a plurality of radar systems coexist in the same frequency band.

In another arrangement that has been studied but has not been achieved, as shown in FIG. 13, independently of a radio sensing device mounted on a vehicle, for example, a system in which the same radar as that in the radio sensing device is installed at an intersection. In this system, a radio sensing device mounted on a vehicle performs proximity detection in back of the vehicle. The radio sensing device installed at an intersection performs proximity detection in front of a vehicle from the detection area of the radio sensing device to notify the corresponding vehicle of alert information. In this manner, proximity detection between a vehicle and a pedestrian, proximity detection between an advancing vehicle and a right- or left-turning vehicle, and the like can be performed.

However, a large number of vehicles in each of which 24-GHz-band SRRs of many types are mounted come into a city to disadvantageously cause radio interference between radio sensing devices of the vehicles. Naturally, the SRRs have been expected not to cause radio interference because the SRRs cannot distantly transmit radio waves. However, depending on a relative positional relationship between two vehicles and beam directions thereof, several situations in each of which short-time radio interference may occur can be conceived. Since a radio sensing device is a device directly linked to the safety, even under a rare condition, the risk of radio interference cannot be neglected. The probability of occurrence of the radio interference is required to be minimized. However, even for avoidance of radio interference, addition of new hardware undesirably increases costs. For this reason, a method of decreasing the probability of occurrence of wave interference without increasing the costs in the least has been desired.

In order to address the issue, "frequency hopping" which changes radio frequencies at random or a technique described in Japanese Unexamined Patent Publication No. 10-105228 were devised. Japanese Unexamined Patent Publication No. 10-105228 discloses a technique in which a radio wave having a wavelength equal to or larger than an extremely high frequency is transmitted to a reflecting tape on a roadway to detect a position of a vehicle with respect to a road surface. In this related technique, in order to prevent interference between two vehicles, a device that makes transmission timings of the vehicles different from each other to prevent the transmission timings from being matched with each other is conceived. However, since the related technique corresponds to so-called "time hopping" that consequently makes transmission timings on the time axis different from each other, as shown in FIG. 12, a cycle T' becomes long. For this reason, a wasted time for which an antenna is not scanned is generated to cause the fear of deteriorating the safety.

An example in which the risk of occurrence of radio interference is present in the related technique will be described with reference to FIG. 10. In FIG. 10, in the vehicle 1, the four antennas are sequentially selected by the switch circuit (321) and the switch control circuit (323) to form a sector-shaped detection area. In a vehicle 2, four antennas are sequentially selected by a switch circuit (322) and a switch control circuit (324) to form a sector-shaped detection area.

It is known that, in a quasi-extremely-high frequency band such as a 24-GHz band, radio interference easily occurs when two antennas come close to each other or face each other. This situation, for example, as indicated by arrows in the drawing, can occur between two antennas in a region (335) when two vehicles are closely running in parallel with each other by chance. Although the two radio sensing devices of the two vehicles are not synchronized with each other at all, when control timings of the switch control circuit (324) and the switch control circuit (323) come close to each other by chance as shown in FIG. 10, radio interference may disadvantageously continuously occur in a plurality of time domains (331 to 334) in the drawing. The phenomenon described above may occur not only between vehicles, but also, for example, as shown in FIG. 13, between a radio sensing device installed at an intersection and a radio sensing device mounted on a vehicle.

Thus, the present invention has been made in consideration of the above issues, and has as an object to provide a radio sensing device and a radar system which reduce the probability of occurrence of radio interference with an adjacently arranged device the type of which is the same as that of the radio sensing device or the radar system or which is similar thereto without increasing costs and an occupied bandwidth.

SUMMARY OF INVENTION

The present invention provides the following items to address the above issues.

(1) One or more embodiments of the present invention provide a radio sensing device which has N antennas, N being a natural number which is one or more, and a switching control unit that sequentially switches the antennas and scans radio waves in some directions or all directions in a circular shape or a spherical-shell shape, including a random number generating unit that generates random numbers, wherein the switching control unit sets a unit time required to sequentially scan each of all the N antennas once as T, and performs an operation of switching selecting orders of the N antennas within a time which is M (M; positive integer) times the T on the basis of the generated random numbers.

(2) One or more embodiments of the present invention provide a radio sensing device which includes a switching control unit which performs an operation of sequentially electrically or mechanically switching N beam directions of a single antenna, N being a natural number which is one or more, to scan radio waves in some directions or all directions in a circular shape or a spherical-shell shape, including a random number generating unit that generates random numbers, wherein the switching control unit sets a unit time required to sequentially scan each of all the N beam directions once as T, determines a selecting order for selecting the directions of the single antenna from the N beam directions within a time which is M (M; positive integer) times the T on the basis of the generated random numbers, and performs the operation of electrically or mechanically switching the directions of the single antenna.

(3) One or more embodiments of the present invention provide a radio sensing device wherein the radio sensing device (1) includes a selecting unit that selects a value for the M.

(4) One or more embodiments of the present invention provide a radar system wherein the radio sensing device described in (1) which is arranged at each of front and rear corner portions of a vehicle, and the switching control units arranged at adjacent corner portions on the same vehicle perform operations of mutually switching scanning orders of beam directions of the antennas by using different random numbers.

(5) One or more embodiments of the present invention provide a radar system including the radio sensing device described in (1) arranged at least a rear corner portion of a vehicle and the radio sensing device described in (1) arranged on a sidewalk, a side strip, or a runway outside line on the sidewalk side, wherein the switching control units arranged at adjacent corner portions on the same vehicle or the switching control units of the radio sensing devices arranged on the vehicle and on the sidewalk, the side strip, or the runway outside line on the sidewalk side further perform operations of mutually switching scanning orders of the beam directions of the antennas by using different random numbers.

(6) One or more embodiments of the present invention provide a radar system wherein, in the radar system in (5), the sidewalk, the side strip, or the runway outside line on the sidewalk side is at least the sidewalk, the side strip, or the runway outside line on the sidewalk side near a point where driving lanes cross each other or near a point where a driving lane and a railroad cross each other.

(7) One or more embodiments of the present invention provide a radar system including a plurality of radio sensing devices each according to (2) arranged at respective front and rear corner portions of a vehicle, wherein the switching control units of the radio sensing devices arranged at adjacent corner portions on the vehicle further perform operations of mutually switching scanning orders of beam directions of the antennas by using different random numbers.

(8) One or more embodiments of the present invention provide a radar system including one or more first radio sensing devices according to (2) arranged at at least a rear corner portion of a vehicle, and one or more second radio sensing devices according to claim 1 arranged on a sidewalk, a side strip, or a runway outside line on the sidewalk side, wherein the switching control units arranged at adjacent corner portions on the vehicle or the switching control units of the radio sensing devices arranged on the vehicle and on the sidewalk, the side strip, or the runway outside line on the sidewalk side further perform operations of mutually switching scanning orders of the beam directions of the antennas by using different random numbers.

(9) One or more embodiments of the present invention provide the radar system according to (8), wherein the sidewalk, the side strip, or the runway outside line on the sidewalk side is at least the sidewalk, the side strip, or the runway outside line on the sidewalk side near a point where driving lanes cross each other or near a point where a driving lane and a railroad cross each other.

According to one or more embodiments of the present invention, a new concept "direction hopping" is newly introduced to make it possible to advantageously decrease the probability of occurrence of wave interference by only changing software controls without adding new hardware. More specifically, so-called "frequency hopping" is a communication scheme that performs communication while changing radio frequencies at random. In contrast to this, the "direction hopping" according to one or more embodiments of the present invention perform radar searching while changing scanning directions of radio beams at random. In this manner, the probability of causing the beam directions of two adjacent radio sensing devices to continuously face to each other two or more times by chance can be reduced.

According to one or more embodiments of the present invention, in a radio sensing device such as a CTA radio sensing device which operates beam directions in a sector shape or a spherical-shell shape, the probability of occurrence of radio interference with an adjacent similar device can be advantageously minimized without increasing all costs.

DETAILED DESCRIPTION

Embodiments of the present invention will be described below in detail with reference to the accompanying drawings.

Constituent elements according to the embodiments can be arbitrarily replaced with existing constituent elements or the like, and various variations including combinations between the constituent elements and other constituent elements can be effected. Thus, the descriptions of the embodiments do not limit the contents of the invention described in the scope of claims.

First Embodiment

A first embodiment of the present invention will be described below with reference to FIGS. 1 to 4.

In this embodiment, two vehicles will be exemplified.

Figure 3A:
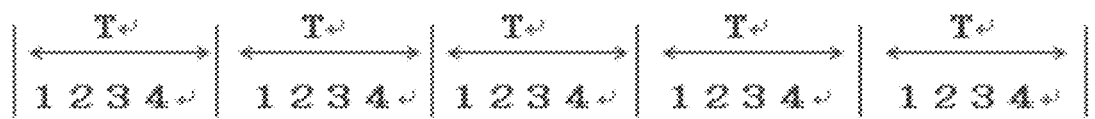
FIGS. 3A, 3B, and 3C are diagrams for explaining an operation of a switching control unit according to the first embodiment of the present invention.
Figure 3B:
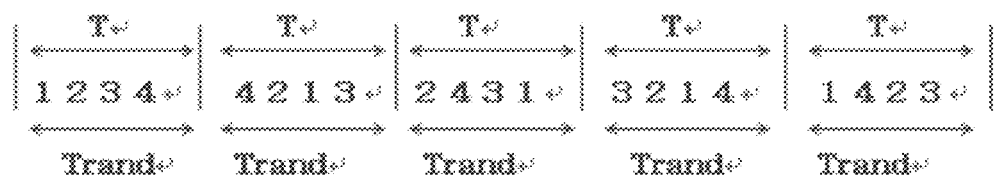
Figure 3C:
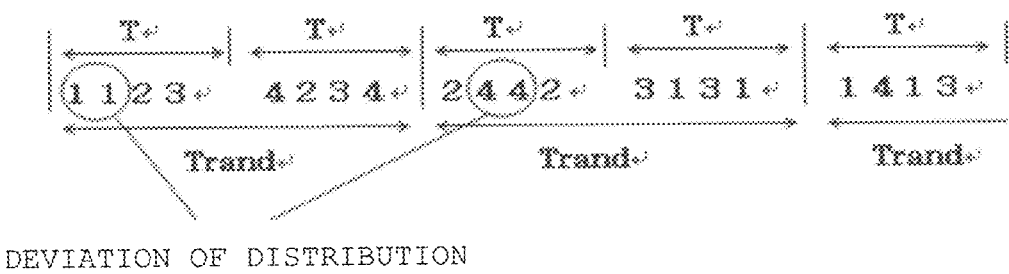

As shown in FIG. 3A, in the past, antennas are switched in a fixed order. In the drawing, reference symbols and numerals "T", "Trand", and "1, 2, 3, or 4" understandably represent a measurement cycle, a time required for making a circle of random numbers, and a selected measurement antenna, respectively. In the embodiment, the measurement cycle "T" is not changed. Measurement antennas are switched as shown in FIG. 3B when Trand=T, and are switched as shown in FIG. 3C when Trand=2T.

<Configuration of Radio Sensing Device>

Figure 1:
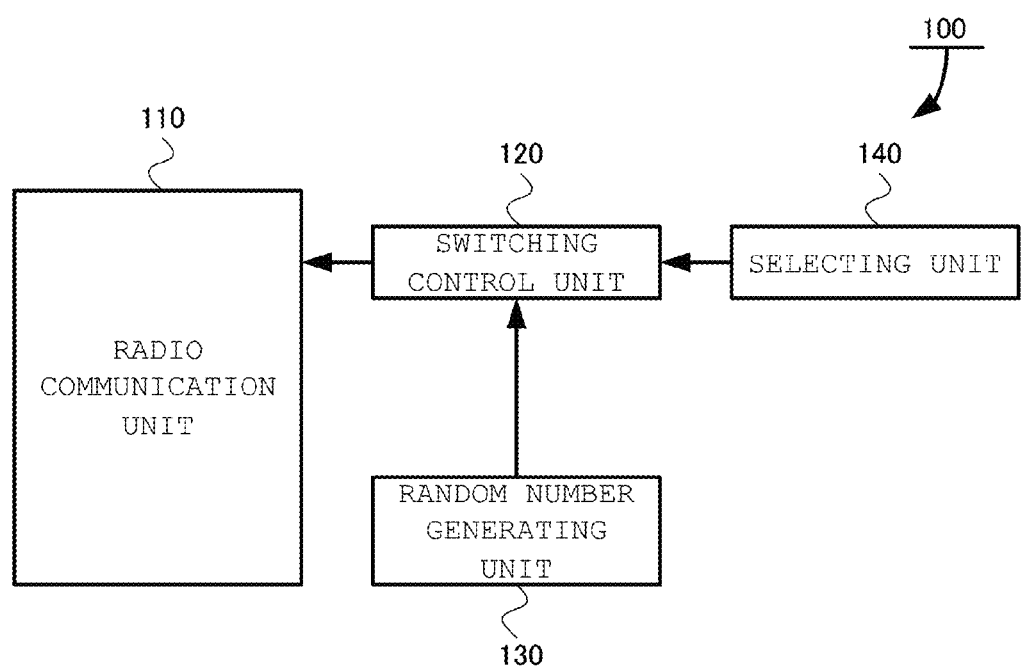
FIG. 1 is a block diagram of a radio sensing device according to a first embodiment of the present invention.

A radio sensing device 100 according to the present invention, as shown in FIG. 1, includes a radio communication unit 110, a switching control unit 120, a random number generating unit 130, and a selecting unit 140.

The radio communication unit 110 is a unit to transmit and receive radio waves by using a plurality of antennas. The detailed configuration of the radio communication unit 110 will be described later.

The switching control unit 120, to sequentially scan each of all the plurality of antennas once, sets a given unit time as T, and performs an operation of switching selecting orders of the plurality of antennas within a time which is M (M; positive integer) times T on the basis of a random number generated by the random number generating unit 130.

The random number generating unit 130 generates random numbers used in switching control in the switching control unit 120. The selecting unit 140 selectively inputs a value of M in the switching control unit 120 from the outside. At this time, the selecting unit 140 is required for the following reason. As shown in FIG. 3C, when Trand=2T or more, the probability of occurrence of radio interference can be reduced, but a "deviation of distribution" generally tends to be deteriorated. More specifically, when Trand=2 or more, trade-off between the probability of occurrence of radio interference and the safety is caused. For this reason, selection depending on applications or specifications need to be enabled. When the value of M is a fixed value, the selecting unit 140 is not required.

<Configuration of Radio Communication Unit>

Figure 2:
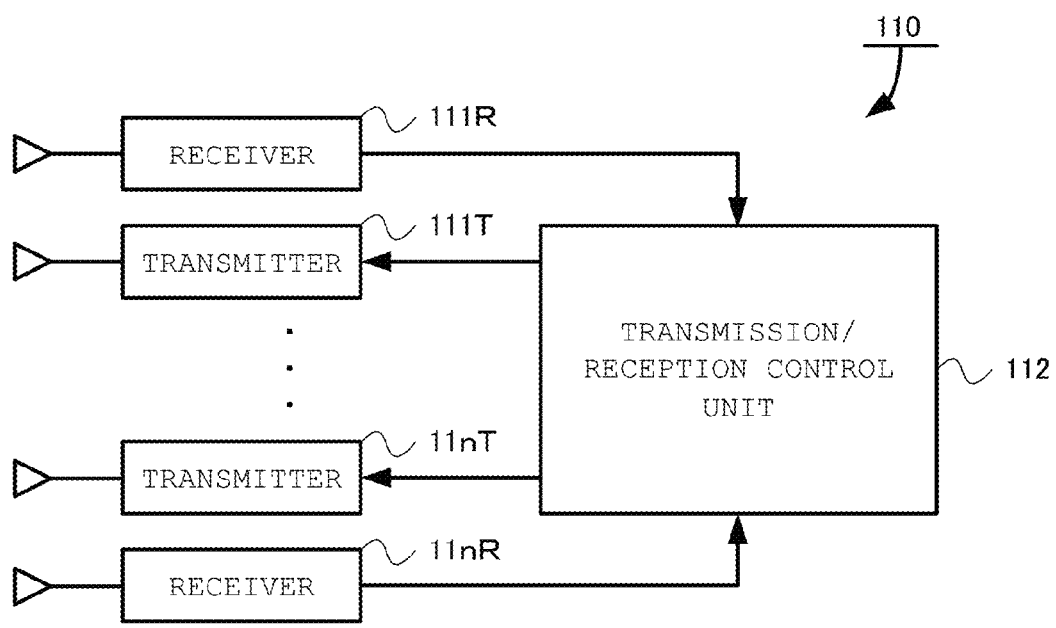
FIG. 2 is a block diagram of a radio communication unit according to the first embodiment of the present invention.

The radio communication unit 110 according to the embodiment, as shown in FIG. 2, includes a plurality of receivers and receiving antennas 111R to 11nR, a plurality of transmitters and transmitting antennas 111T to 11nT, and a transmission/reception control unit 112.

Figure 4:
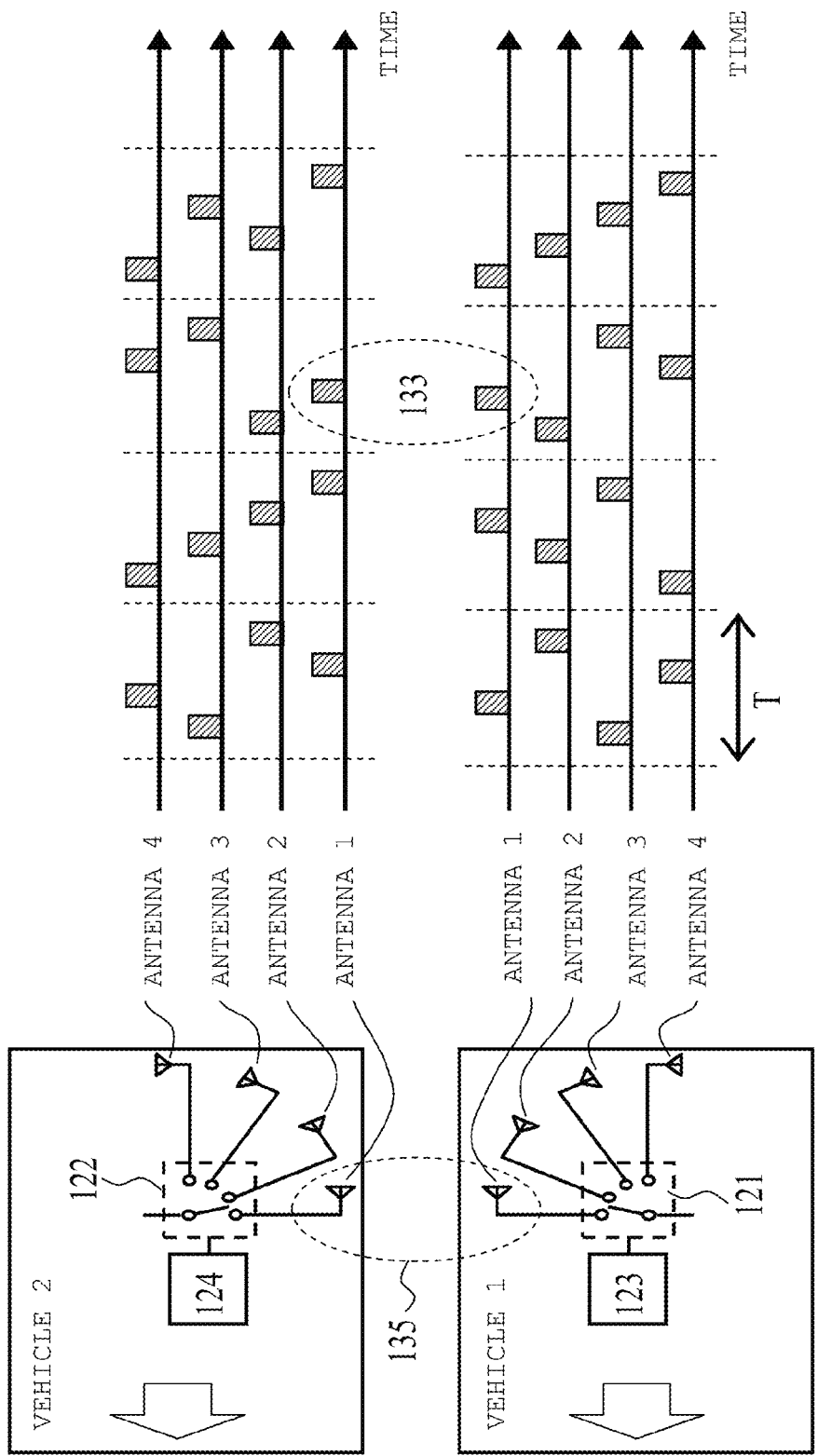
FIG. 4 is a schematic diagram according to the first embodiment of the present invention.

In the radio sensing device 100 according to the embodiment, as shown in FIG. 4, in the vehicle 1, at one corner of the vehicle 1, four antennas and the switching control unit 120 including a switch circuit (121) and a switch control circuit (123) are arranged. The switching control unit 120 sequentially selects the antennas 1 to 4 to form a sector-shaped detection area.

Note that the switch control circuit (123) has the functions of a CPU and is configured to control the switch circuit (121), activate a switched-on antenna, and transmit a radio wave.

In a vehicle 2, at one corner of the vehicle 2, four antennas and a switching control unit 120 including a switch circuit (122) and a switch control circuit (124) are arranged. The antennas 1 to 4 are sequentially selected to form a sector-shaped detection area.

As has been described above, for example, as indicated by arrows in the drawing, radio interference easily occurs between two antennas having adjacent regions (135) when two vehicles are closely running in parallel with each other by chance. However, in the present invention, the two switch control circuits (123 and 124) control the switch circuits (121 and 122), respectively, with random numbers within the above described time T to determine an antenna selecting order.

As a result, each of the antennas, as shown in a time chart in FIG. 4, is selected at random within the time T, and the risk of occurrence of radio interference is eliminated in time domains except for a time domain (133) in the drawing.

Figure 10:
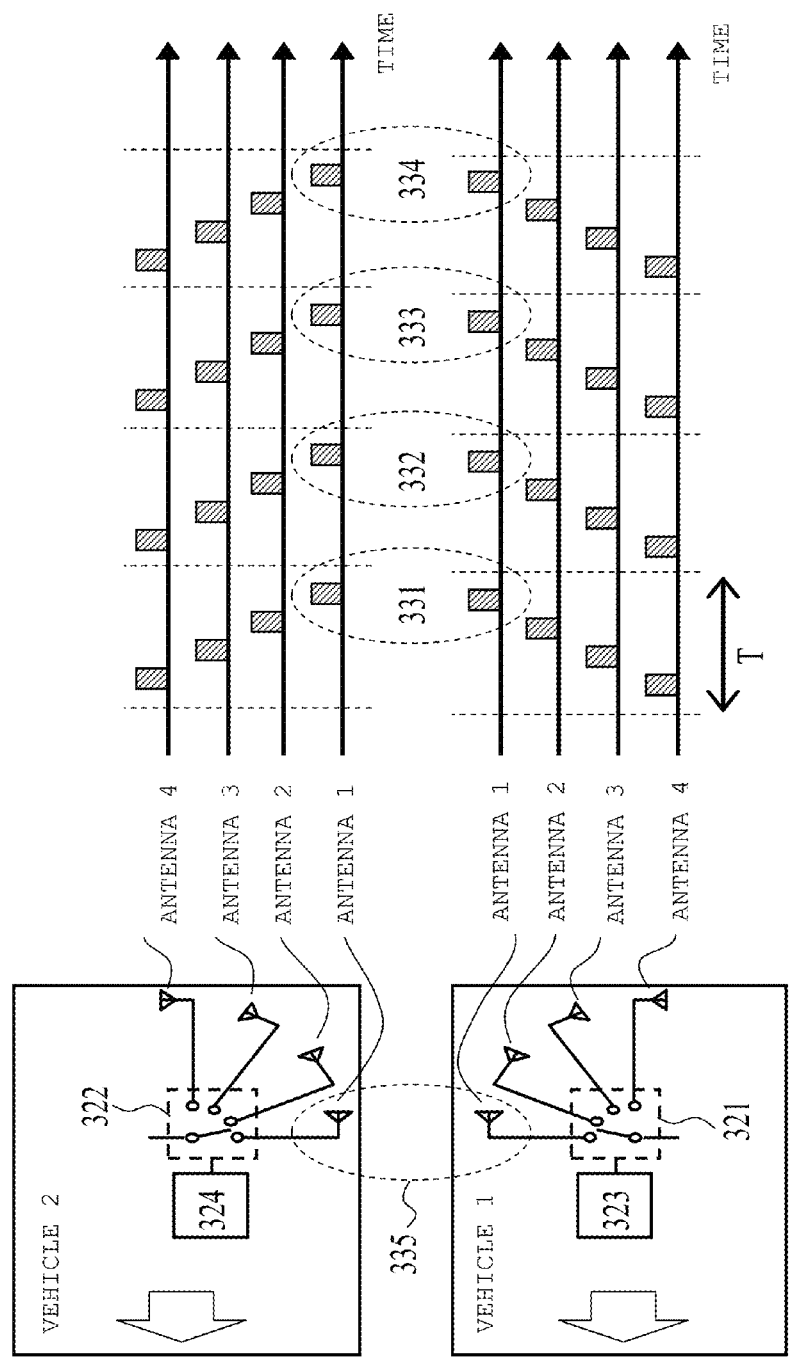
FIG. 10 is a diagram showing an outline of CTA.
Figure 11:
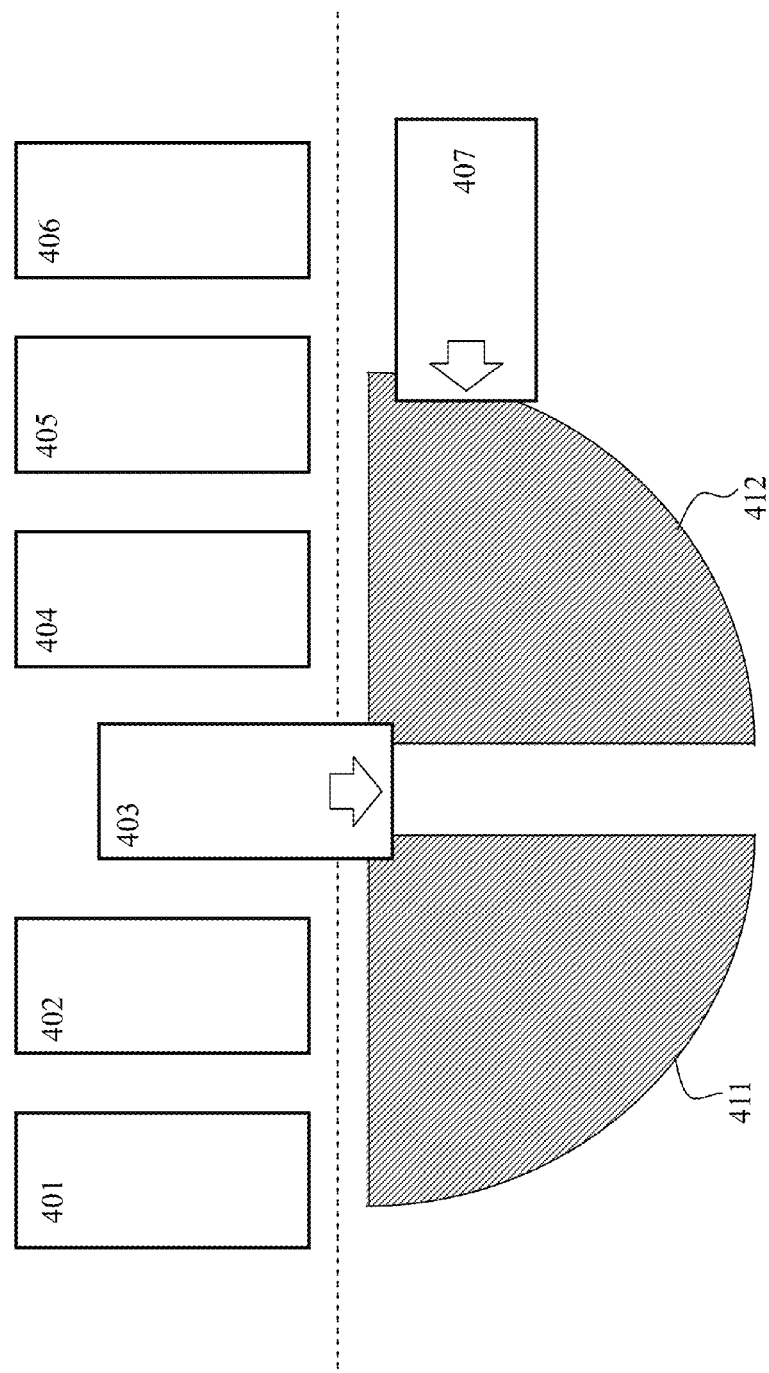
FIG. 11 is a diagram showing an outline of CTA.
Figure 12:
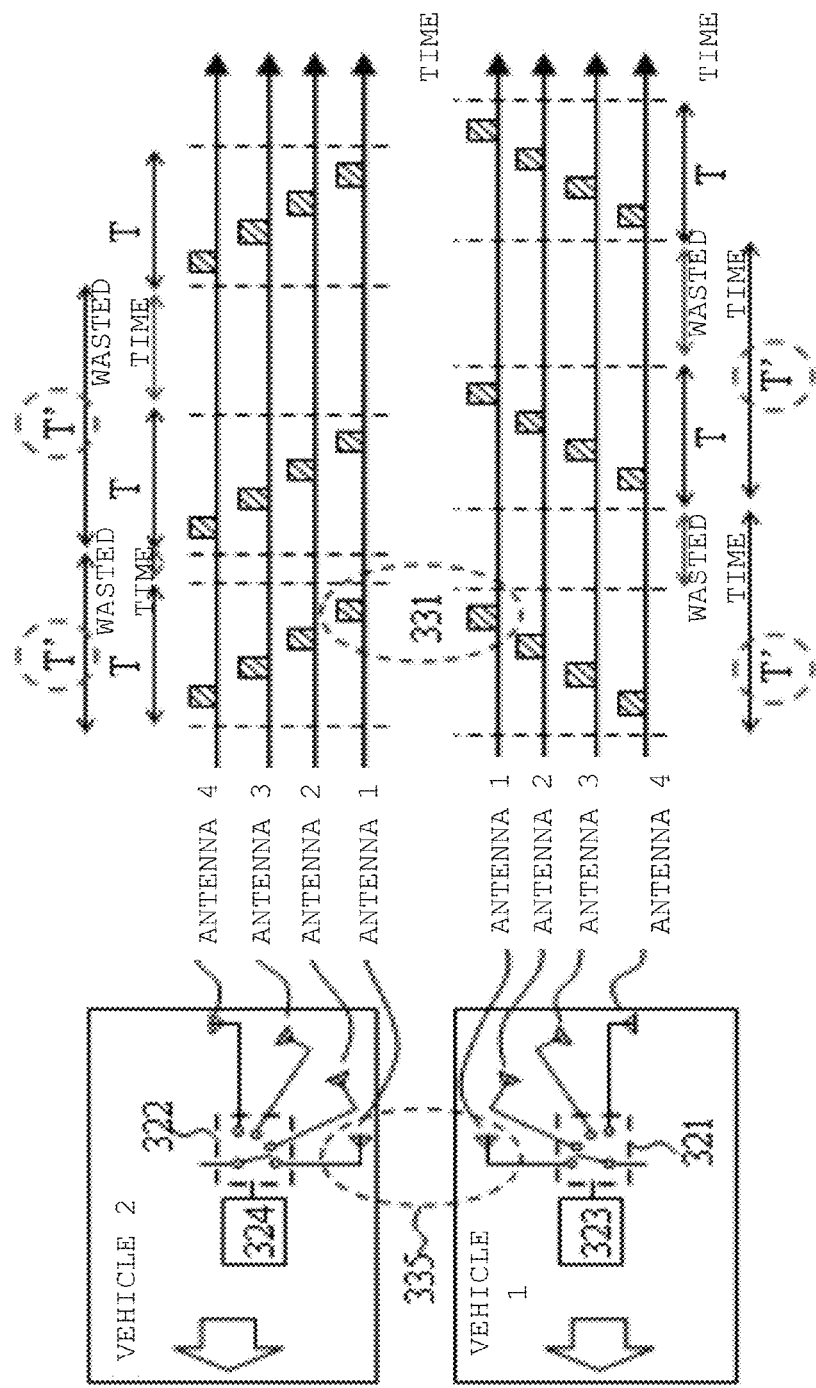
FIG. 12 is a schematic diagram according to a related technique.
Figure 13:
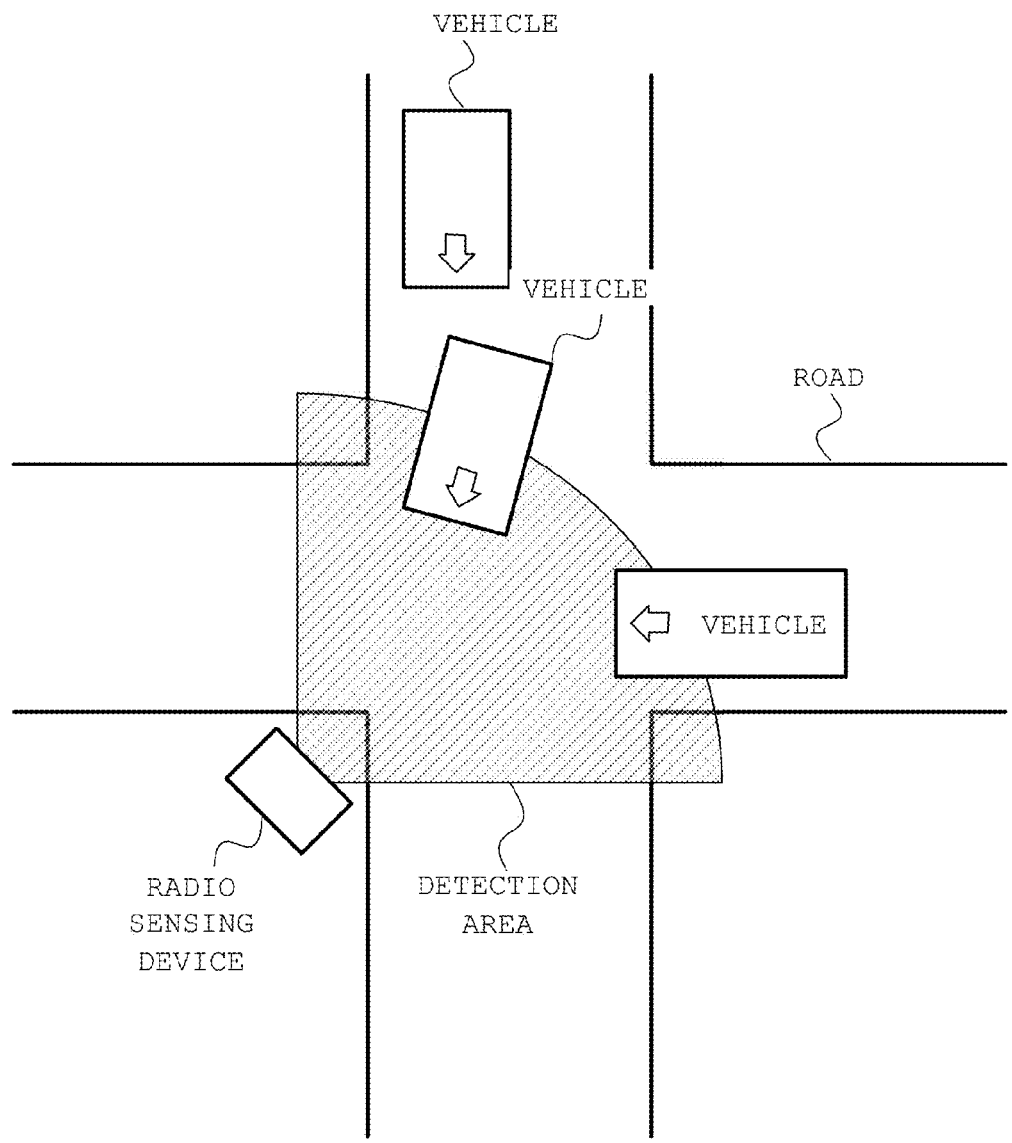
FIG. 13 is a diagram for explaining the related technique.

More specifically, as in the related technique in FIG. 10, radio interference does not continuously occur over a plurality of time domains. For this reason, the probability of occurrence of radio interference can be considerably reduced. Since the time T is equal to that in the related technique in FIG. 10 and need not be elongated, a wasted time is eliminated unlike in the related technique in FIG. 12, and a period in which any antenna is not scanned at all is not made. For this reason, the safety is not deteriorated. Although not shown, the switching control unit 120 is arranged at each of the front and rear corners of a vehicle, and, similarly, the selecting order of the antennas within the time T is determined by generating random numbers.

Second Embodiment

A second embodiment of the present invention will be described below with reference to FIG. 5 and FIG. 6.

In the first embodiment, a scanning order of beam directions is the effect of the embodiment, and a unit for scanning the beam directions is not limited to a specific unit. In FIG. 4, a so-called switch changeover scheme which selects a plurality of antennas such that the antennas are arranged in a circular shape or a spherical-shell shape is described. However, as the unit for scanning beam directions, a mechanical scanning scheme or the like known as another unit may be used. More specifically, as shown in FIG. 6, an entire antenna may be physically turned in predetermined directions (for example, by a stepping motor, a gear, and the like) to change the directions.

Figure 7:
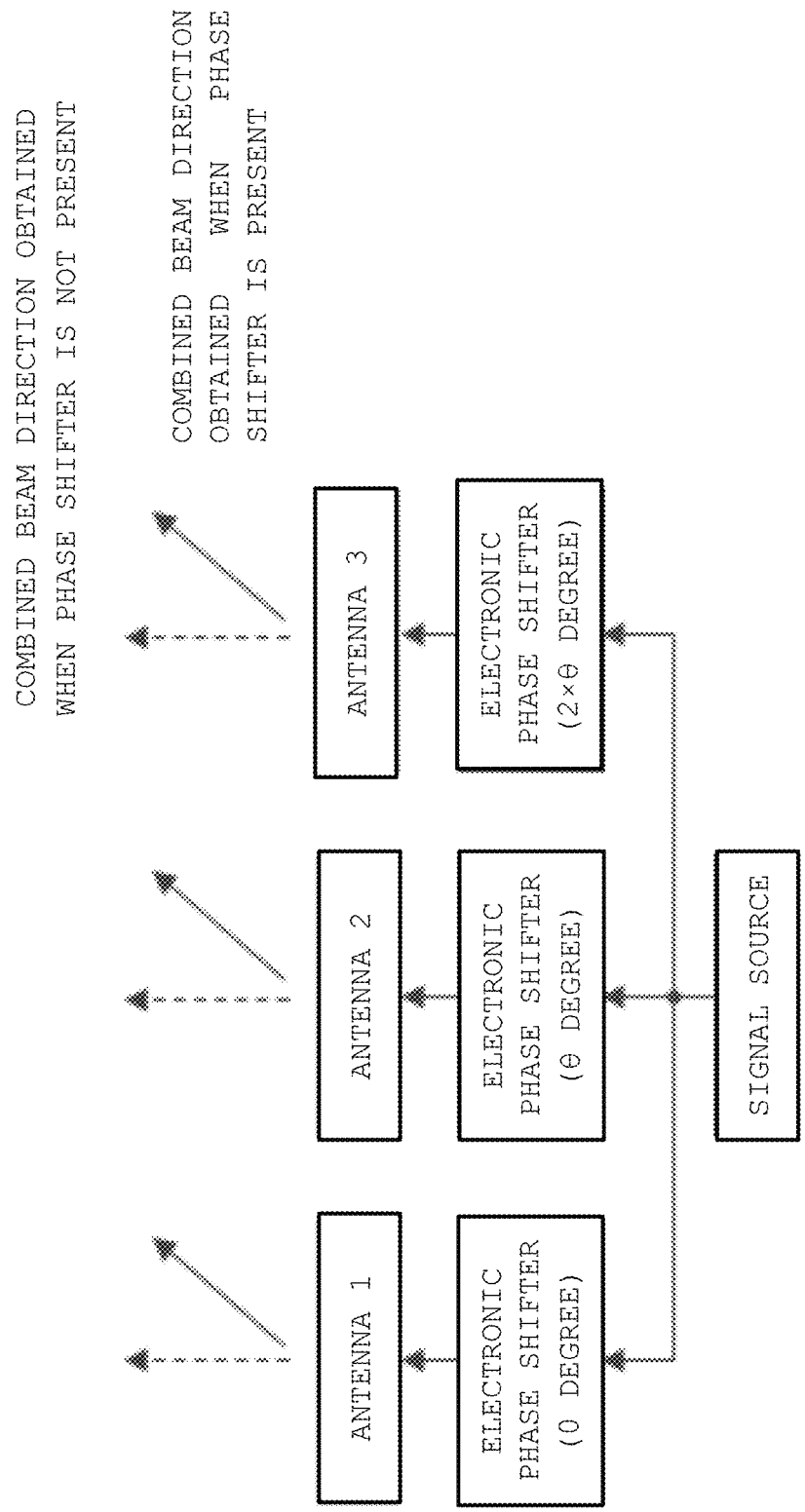
FIG. 7 is a schematic diagram of an antenna control method using an electronic scanning scheme according to the second embodiment of the present invention.

On the other hand, in the electronic scanning scheme, a feeding phase to each of unit antennas constituting an array antenna is finely adjusted to scan a combined beam direction of the entire array antenna. The present invention can also be applied to these techniques. In this case, as shown in FIG. 7, a value e is allocated according to the electronic scanning scheme to make it possible to freely change the beam directions. In this case, an "electronic phase shifter" is a "delay line" which switches signal phases with a switch circuit.

<Configuration of Radio Sensing Device>

Figure 5:
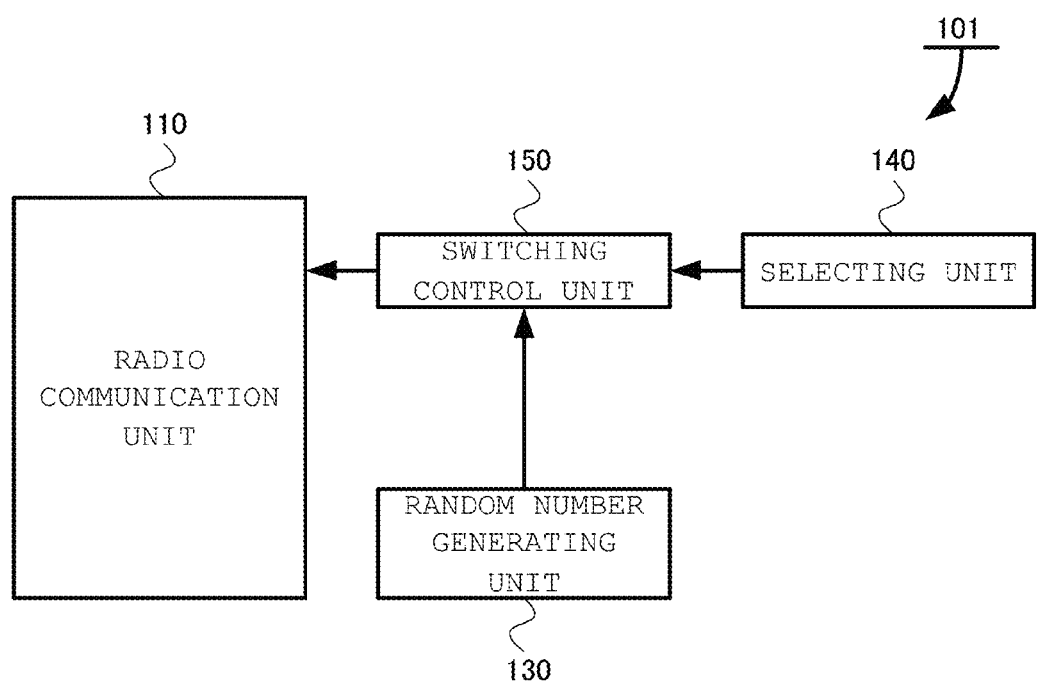
FIG. 5 is a block diagram of a radio sensing device according to a second embodiment of the present invention.
Figure 6:
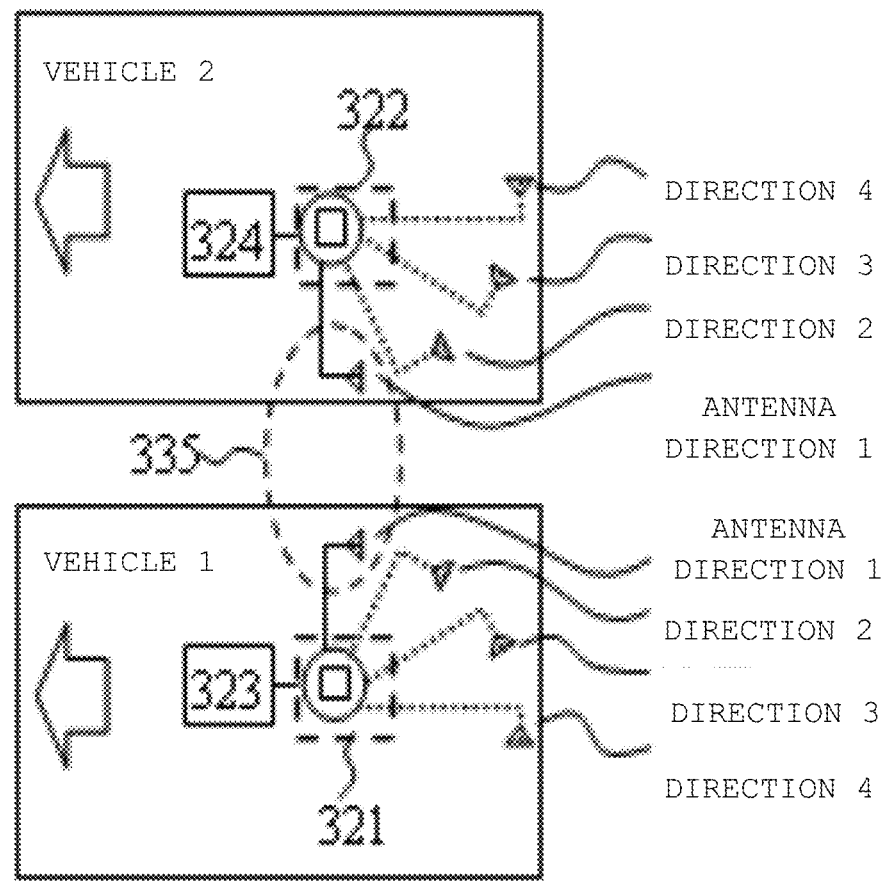
FIG. 6 is a schematic diagram of an antenna control method using a mechanical scanning scheme according to the second embodiment of the present invention.

A radio sensing device 101 according to the embodiment, as shown in FIG. 5, includes a radio communication unit 110, a switching control unit 150, a random number generating unit 130, and a selecting unit 140. Since the same constituent elements to which the same reference numerals as those in the first embodiment are added have the same functions as those in the first embodiment, respectively, a detailed description thereof will not be described.

The switching control unit 150 according to the embodiment sequentially switches the beam directions of a single antenna according to an electronic scheme or a mechanical scheme (for example, by a stepping motor, gears, and the like) to N directions. More specifically, with respect to the single antenna, a unit time required to sequentially scan each of all the N beam directions once is represented by T. Within a time which is M (M: a positive integer) times T, an operation of switching antenna selecting orders with respect to the N beam directions on the basis of random numbers generated by the random number generating unit 130.

More specifically, in the embodiment, a unit time required to sequentially scan each of all the N beam directions once is represented by T, and, within a time which is M (M: a positive integer) times T, an operation of making the antenna selecting orders with respect to the N beam directions random numbers to switch the antenna selecting orders is performed. For this reason, unlike in the related technique in FIG. 10, radio interference does not continuously occur over a plurality of time domains. Thus, the probability of occurrence of radio interference can be considerably reduced. Since the time T is not periodically shifted, unlike in the related technique in FIG. 12, a wasted time is not generated. In addition, a period in which any antenna is not scanned at all is not made. For this reason, the safety is not deteriorated. Although not shown, the switching control unit 120 is arranged at each of the front and rear corners of the vehicle, and, similarly, antenna selecting orders with respect to the N beam directions within the time T are made random numbers and determined.

Third Embodiment

A third embodiment of the present invention will be described below with reference to FIG. 8.

In the first and second embodiments, an issue of radio interference between two radio sensing devices independently mounted on two vehicles, respectively, is pointed out. However, as shown in FIG. 8, the risk of occurrence of radio interference may be caused even between two radio sensing devices mounted on the same vehicle. For example, as shown in FIG. 8, the risk is caused when a radio wave radiated from a rearmost antenna of the radio sensing device at a rear left corner (342) is reflected by a nearby wall and strikes a rearmost antenna of the radio sensing device at a rear right corner (341). At this time, the risk of occurrence of radio interference in a domain (236) in the drawing is present.

Figure 8:
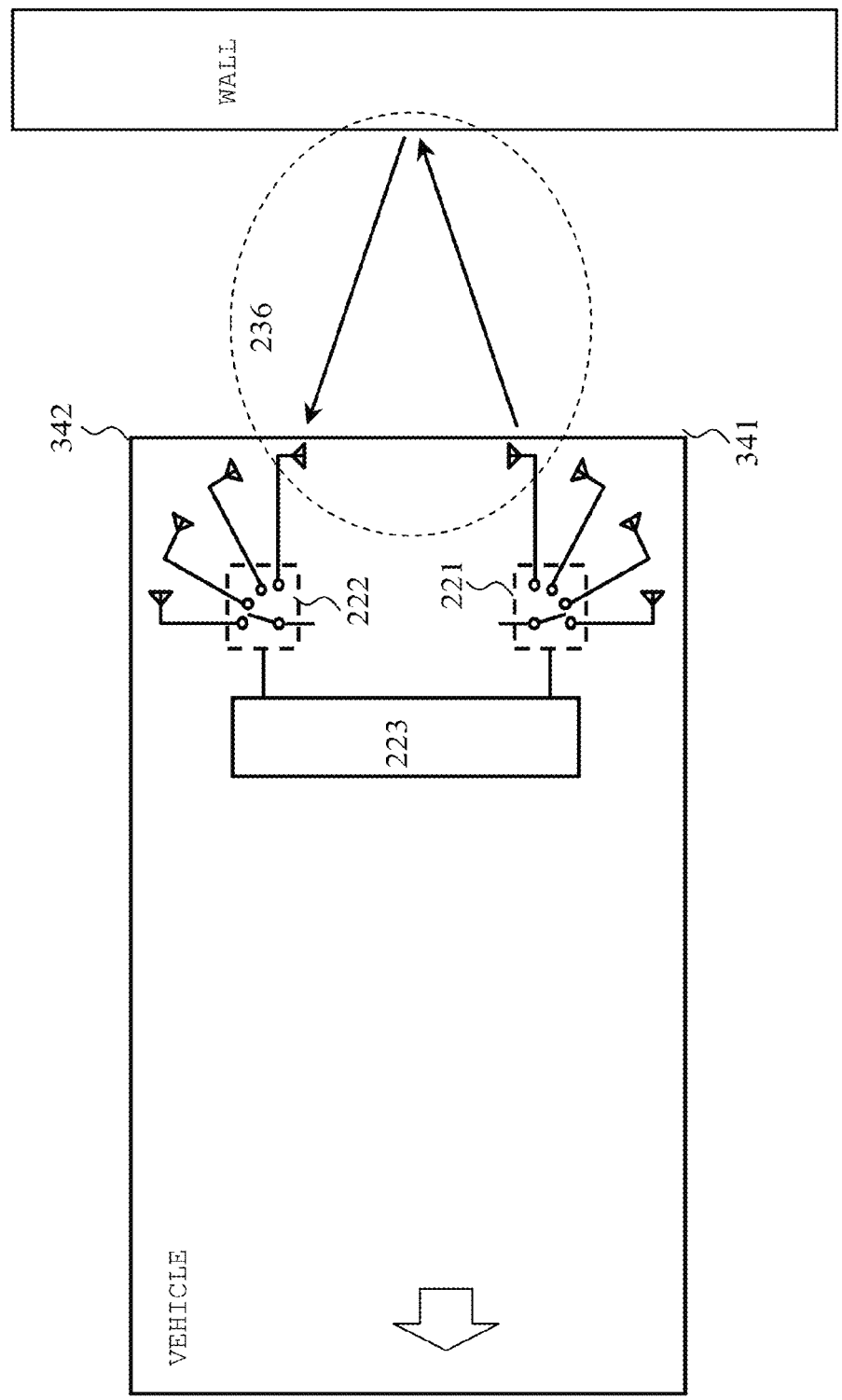
FIG. 8 is a schematic diagram according to a third embodiment of the present invention.

In this case, in the embodiment, as shown in FIG. 8, a switch control circuit (223) is shared by radio sensing devices at two adjacent corners, different random numbers are intentionally given to two switch circuits (221 and 222), respectively, to make it possible to minimize the probability of occurrence of radio interference.

Even in the first embodiment and the second embodiment described above, a configuration in which the switch control circuit (223) is used as the two switch control circuits adjacent to each other in front of and rear of the vehicle and shared by the radio sensing devices may be used. The two switch circuits (123 and 124) may be controlled by different switch control circuits having different random numbers.

Fourth Embodiment

A fourth embodiment of the present invention will be described below with reference to FIG. 9.

In the embodiment, the radio sensing device described in the first embodiment or the like is arranged at at least a rear corner portion of a vehicle, a similar radio sensing device is also arranged on a sidewalk, a side strip, or a runway outside line on the sidewalk side, switching control units arranged at adjacent corner portions on the same vehicle or switching control units of the radio sensing devices arranged on the vehicle and on the sidewalk, the side strip, or the runway outside line on the sidewalk side perform an operation of mutually switching scanning orders of the beam directions of the antennas by using different random numbers.

Figure 9:
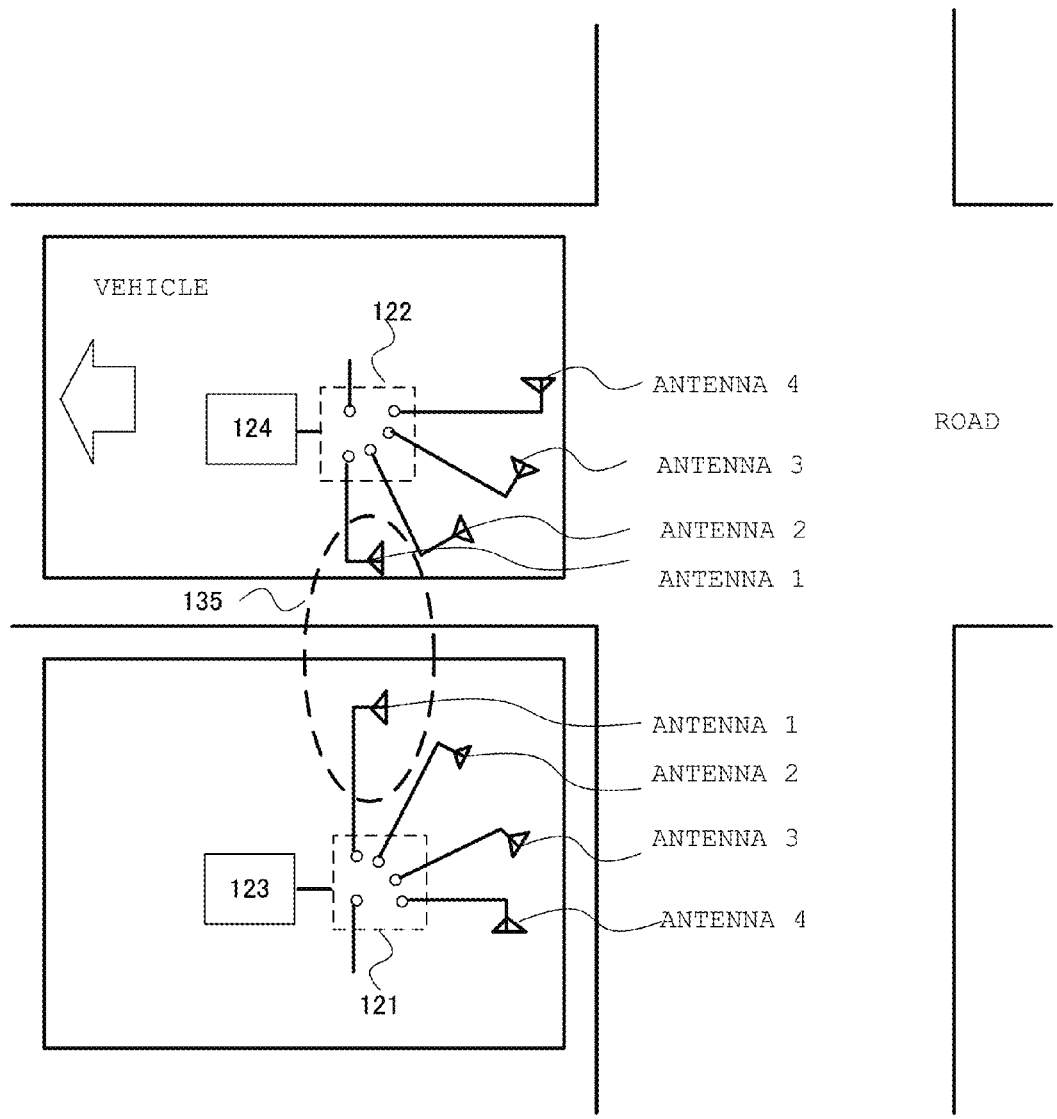
FIG. 9 is a schematic diagram according to a fourth embodiment of the present invention.

The radio sensing device 100 according to the embodiment, as shown in FIG. 9, in a vehicle, includes four antennas arranged at one corner of the vehicle and a switching control unit 120 configured by the switch circuit (122) and the switch control circuit (124). This switching control unit 120 sequentially selects the antenna 1 to 4 to form a sector-shaped detection area.

The switch control circuit (124) has the functions of a CPU, and is configured to control the switch circuit (122), activate a switched-on antenna, and transmit a radio wave.

On the sidewalk, the side strip, or the runway outside line on the sidewalk side, the four antennas and the switching control unit 120 configured by the switch circuit (121) and the switch control circuit (123) are arranged. The antennas 1 to 4 are sequentially selected to form a sector-shaped detection area. The radio sensing device arranged on the sidewalk, the side strip, or the runway outside line on the sidewalk side is preferably arranged at a position above the tops of running vehicles to look down the detection area in the detection area.

As has been described above, radio interference, for example, as indicated by arrows in the drawing, easily occurs between two antennas having adjacent regions (135) when the radio sensing device arranged on a vehicle and the radio sensing device arranged on the sidewalk, the side strip, or the runway outside line on the sidewalk side come close to each other by chance. However, in the present invention, the two switch control circuits (123 and 124) control the switch circuits (121 and 122), respectively, within the predetermined time T with random numbers to determine a selecting order of the antennas.

For this reason, unlike in the related technique in FIG. 10, since radio interference does not continuously occur over a plurality of time domains, the probability of occurrence of radio interference can be considerably reduced. Since the time T need not be elongated as in the related technique in FIG. 10, a wasted time is not generated unlike in the related technique in FIG. 12, and a period in which any antenna is not scanned at all is not made. For this reason, the safety is not deteriorated.

Thus, the radio sensing device can also be applied to, for example, a system in which the radar described in the embodiment is arranged in a traffic light at an intersection and a detection result obtained by the radar is transmitted to a vehicle through a radio wave or the like to prevent crossing collision and to detect a person to prevent an accident caused by a left-turning vehicle. In addition, when the radio sensing device is designed to detect a person, a vehicle, and an obstacle on a railroad crossing or the like, the radio sensing device can be employed as a railroad crossing obstacle detection device which transmits a detection result to a railroad vehicle side.

The processing of the radio sensing device is recorded on a recording medium which can be read by a computer system, a program recorded on the recording medium is loaded on a system microcomputer, and control of the radio sensing device is executed to make it possible to achieve functions corresponding to the radio sensing device or the radar system according to the present invention.

The program may be to achieve some of the functions described above. Furthermore, the program may be a so-called difference file (difference program) which can achieve the functions described above with a combination to a program which has been recorded on the computer system.

As described above, the embodiments of the invention have been described in detail with reference to the accompanying drawings. However, concrete configurations are not limited to the embodiments, and also include designs or the like without departing from the spirit and scope of the invention. For example, the fourth embodiment describes the example in which a detection result detected by a radio sensing device arranged on a sidewalk, a side strip, or a runway outside line on the sidewalk side is transmitted to a vehicle. However, the radio sensing device arranged on the sidewalk, the side strip, or the runway outside line on the sidewalk side can also detect a pedestrian to make it possible to notify the pedestrian of a detection result obtained from the radio sensing device.

REFERENCE SIGNS LIST

100; Radio sensing device
101; Radio sensing device
110; Radio communication unit
111R to 11$n$R; Receiver
111T to 11$n$T; Transmitter
112; Transmission/reception control unit
120; Switching control unit
130; Random number generating unit
140; Selecting unit
150; Switching control unit
121; Switch circuit
122; Switch circuit
123; Switch control circuit
124; Switch control circuit
221; Switch circuit
222; Switch circuit
223; Switch control circuit
321; Switch circuit
322; Switch circuit
323; Switch control circuit
324; Switch control circuit

What is claimed is:

1. A radio sensing device, comprising:
   N antennas, N being a natural number which is two or more;
   a switching control unit that sequentially switches the antennas and scans radio waves in some directions or all directions in a circular shape or a spherical-shell shape; and
   a random number generating unit that generates random numbers, wherein
   the switching control unit sets a unit time required to sequentially scan each of all the N antennas once as T, and performs an operation of switching selecting orders of the N antennas within a time which is M (M; positive integer) times the T on the basis of the generated random numbers.

2. The radio sensing device according to claim 1, wherein a selecting unit that selects a value for the M is arranged.

3. A radar system including a plurality of
   radio sensing devices each according to claim 1 arranged at respective front and rear corner portions of a vehicle, wherein
   the switching control units of the radio sensing devices arranged at adjacent corner portions on the vehicle further perform operations of mutually switching scanning orders of beam directions of the antennas by using different random numbers.

4. A radar system including
one or more first radio sensing devices according to claim 1 arranged at at least a rear corner portion of a vehicle, and one or more second radio sensing devices according to claim 1 arranged on a sidewalk, a side strip, or a runway outside line on the sidewalk side, wherein
the switching control units arranged at adjacent corner portions on the vehicle or the switching control units of the radio sensing devices arranged on the vehicle and on the sidewalk, the side strip, or the runway outside line on the sidewalk side further perform operations of mutually switching scanning orders of the beam directions of the antennas by using different random numbers.

5. The radar system according to claim 4, wherein the sidewalk, the side strip, or the runway outside line on the sidewalk side is at least the sidewalk, the side strip, or the runway outside line on the sidewalk side near a point where driving lanes cross each other or near a point where a driving lane and a railroad cross each other.

6. A radio sensing device, comprising:
a single antenna;
a switching control unit which performs an operation of sequentially electrically or mechanically switching N beam directions of the single antenna, N being a natural number which is two or more, to scan radio waves in some directions or all directions in a circular shape or a spherical-shell shape; and
a random number generating unit that generates random numbers, wherein
the switching control unit sets a unit time required to sequentially scan each of all the N beam directions once as T, determines a selecting order for selecting the directions of the single antenna from the N beam directions within a time which is M (M; positive integer) times the T on the basis of the generated random numbers, and performs the operation of electrically or mechanically switching the directions of the single antenna.

7. A radar system including a plurality of
radio sensing devices each according to claim 6 arranged at respective front and rear corner portions of a vehicle, wherein
the switching control units of the radio sensing devices arranged at adjacent corner portions on the vehicle further perform operations of mutually switching scanning orders of beam directions of the antennas by using different random numbers.

8. A radar system including
one or more first radio sensing devices according to claim 6 arranged at at least a rear corner portion of a vehicle, and one or more second radio sensing devices according to claim 1 arranged on a sidewalk, a side strip, or a runway outside line on the sidewalk side, wherein
the switching control units arranged at adjacent corner portions on the vehicle or the switching control units of the radio sensing devices arranged on the vehicle and on the sidewalk, the side strip, or the runway outside line on the sidewalk side further perform operations of mutually switching scanning orders of the beam directions of the antennas by using different random numbers.

9. The radar system according to claim 8, wherein the sidewalk, the side strip, or the runway outside line on the sidewalk side is at least the sidewalk, the side strip, or the runway outside line on the sidewalk side near a point where driving lanes cross each other or near a point where a driving lane and a railroad cross each other.

* * * * *